J. E. MOORE & G. F. SIMMONS.
CEMENT BLOCK MACHINE.
APPLICATION FILED JAN. 23, 1909.

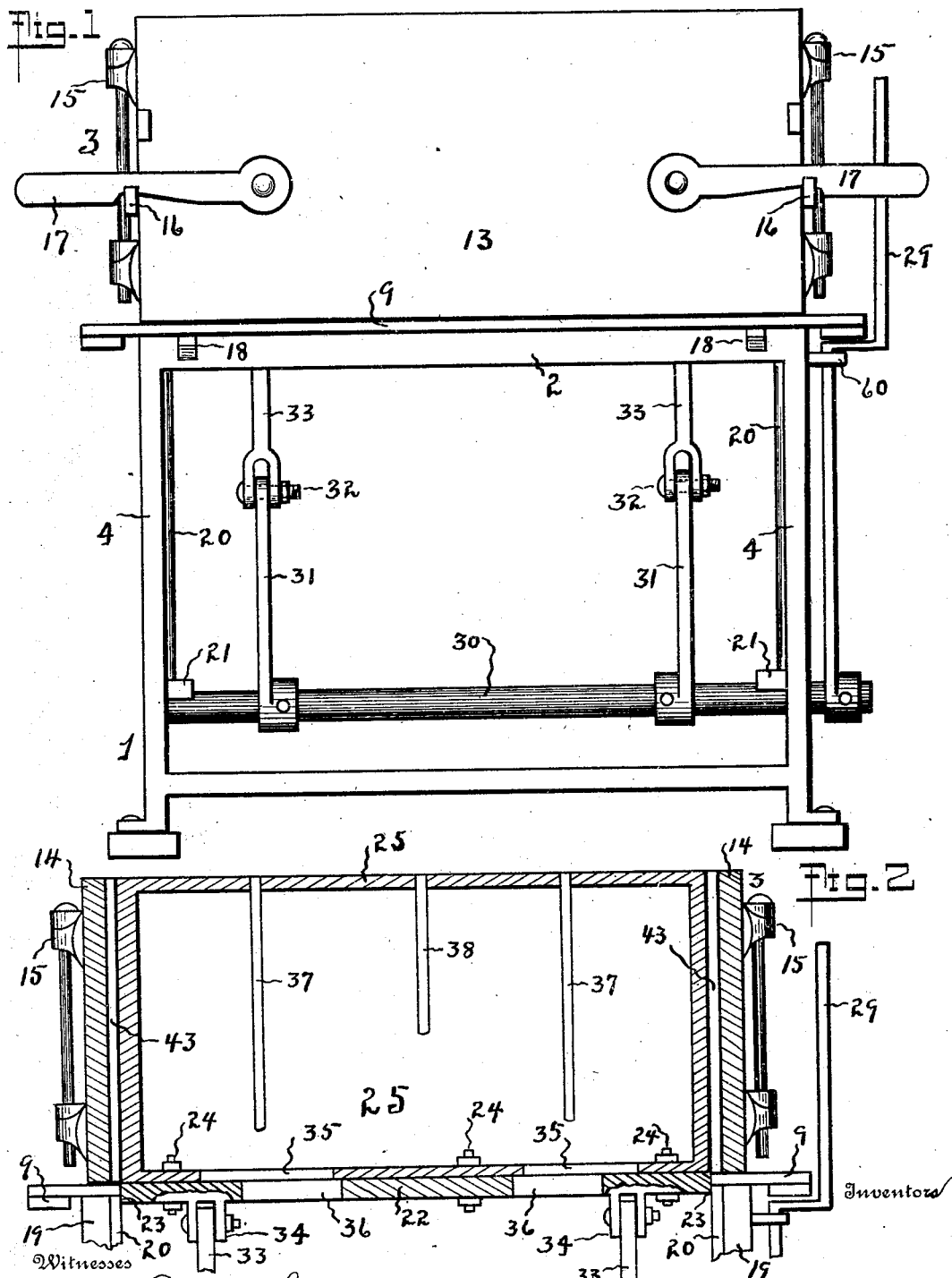

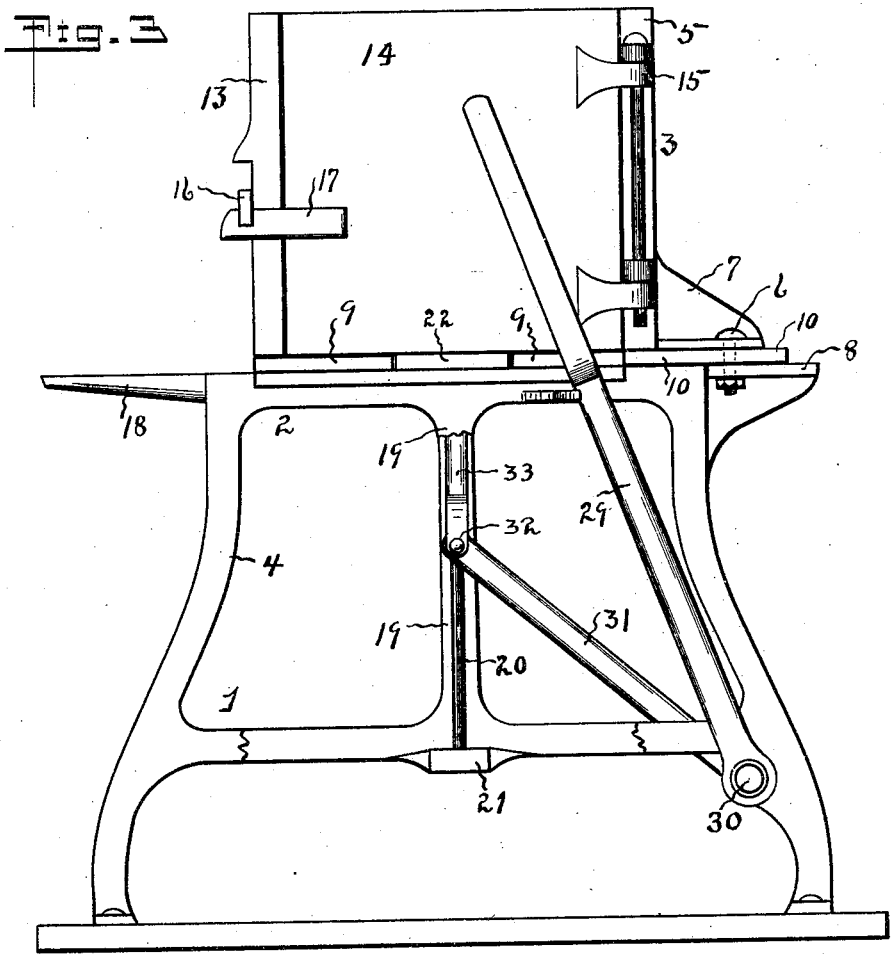
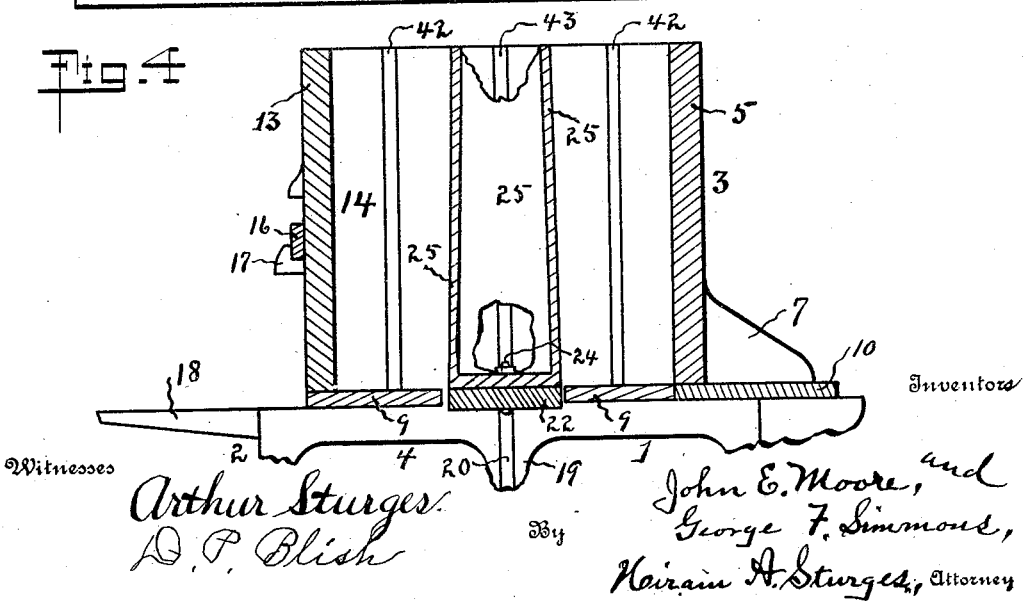

937,627.

Patented Oct. 19, 1909.
6 SHEETS—SHEET 3.

J. E. MOORE & G. F. SIMMONS.
CEMENT BLOCK MACHINE.
APPLICATION FILED JAN. 23, 1909.
937,627.
Patented Oct. 19, 1909.
6 SHEETS—SHEET 4.
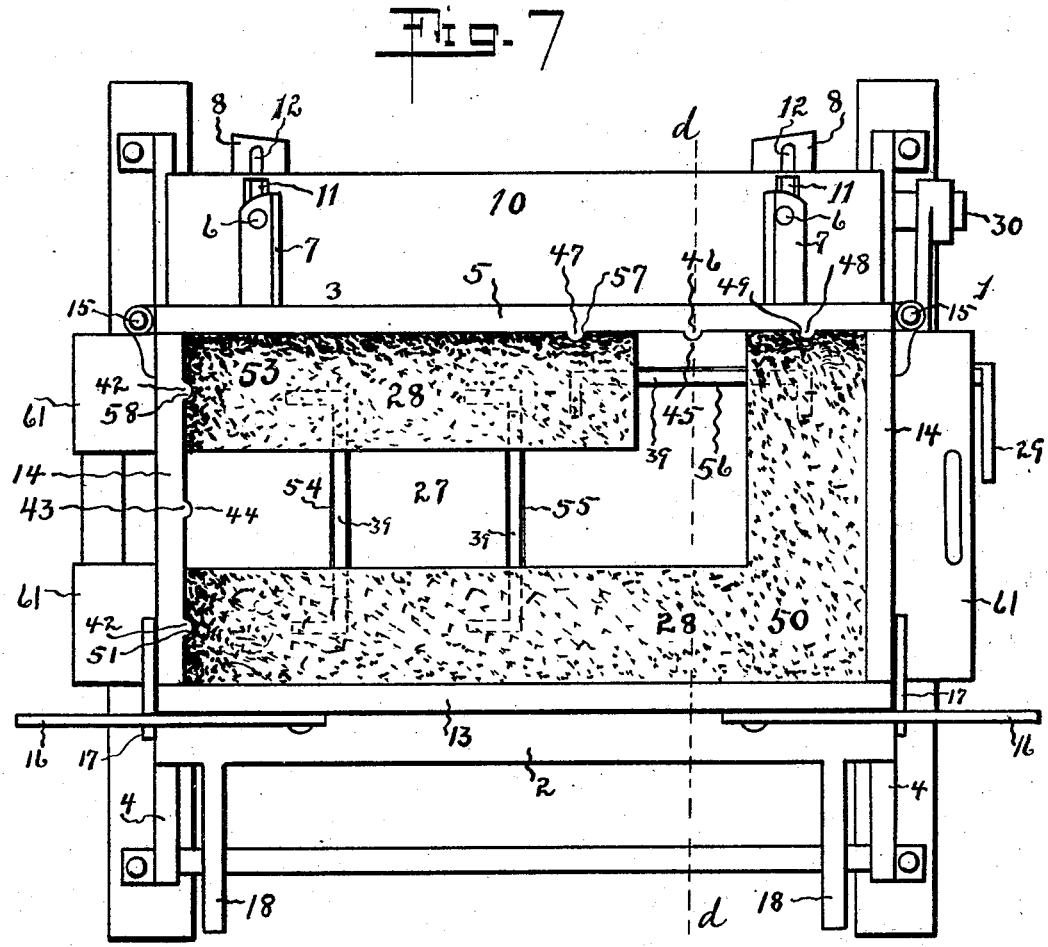
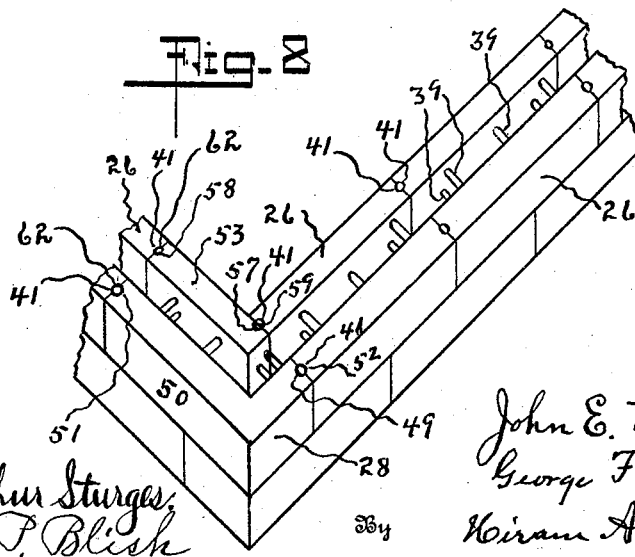

J. E. MOORE & G. F. SIMMONS.
CEMENT BLOCK MACHINE.
APPLICATION FILED JAN. 23, 1909.
937,627.
Patented Oct. 19, 1909.
6 SHEETS—SHEET 5.
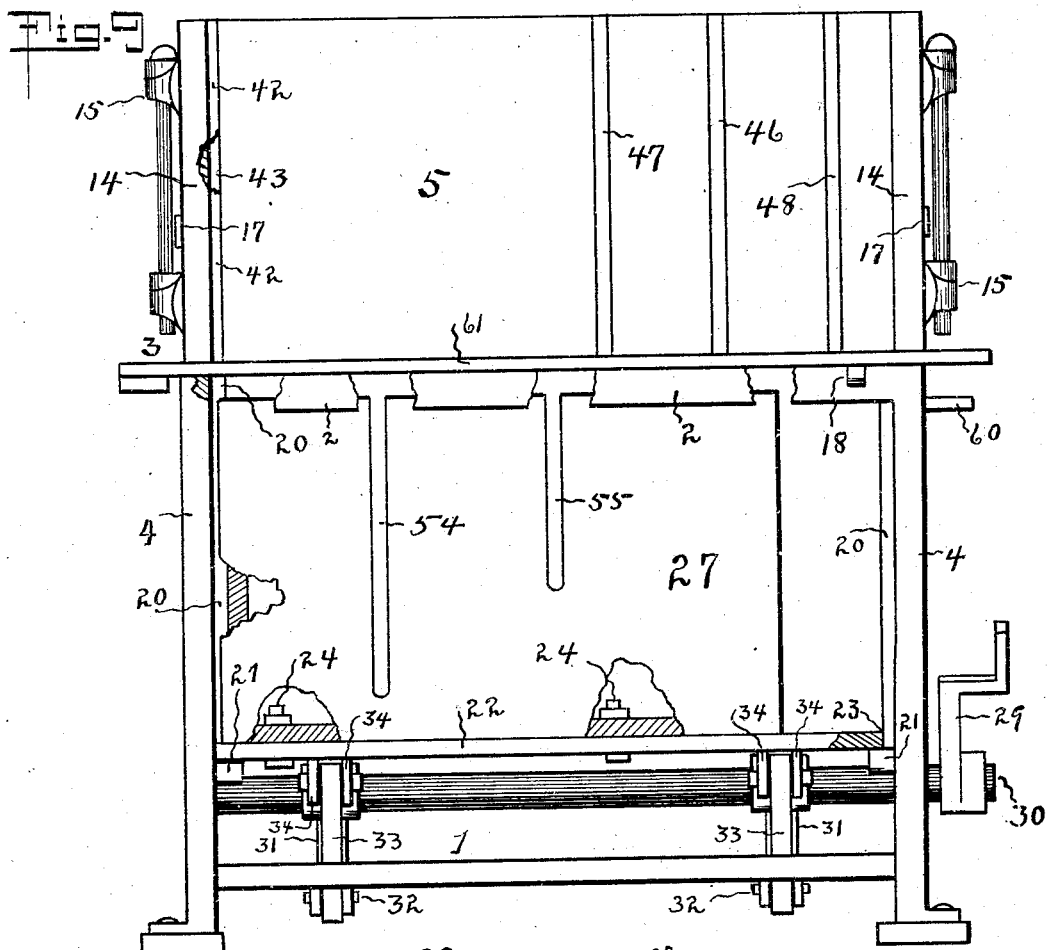
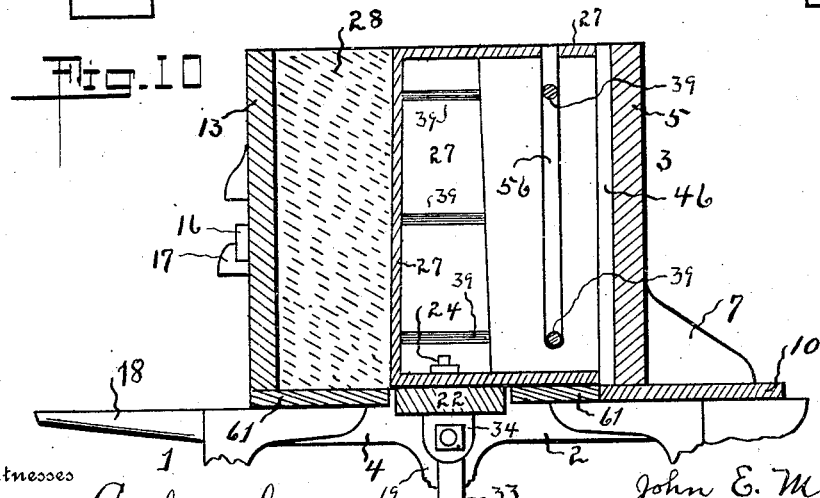
Witnesses
Arthur Sturges.
D. P. Bliss
Inventors
John E. Moore and
George F. Simmons,
By Hiram A. Sturges, Attorney J. E. MOORE & G. F. SIMMONS.
CEMENT BLOCK MACHINE.
APPLICATION FILED JAN. 23, 1909.
937,627.
Patented Oct. 19, 1909.
6 SHEETS—SHEET 6.
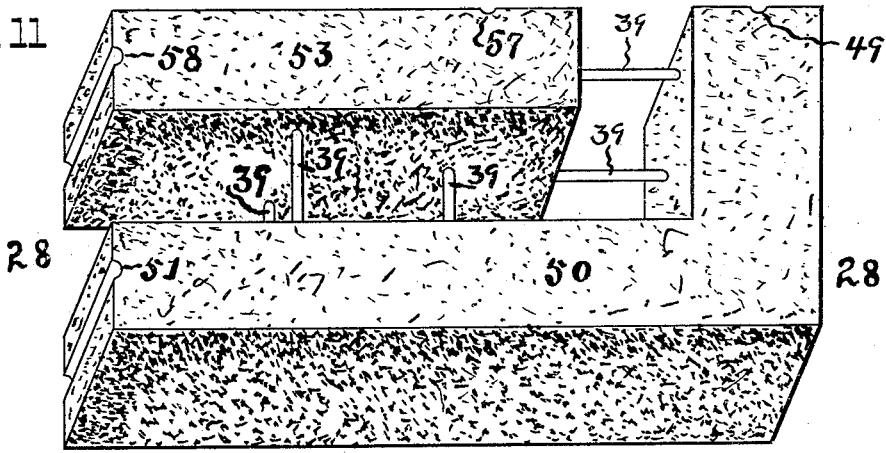
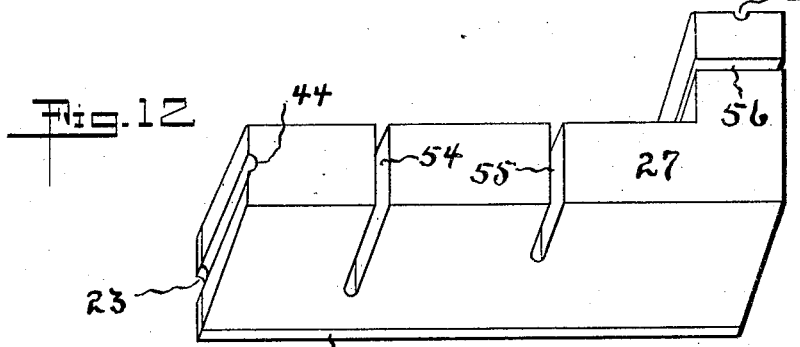
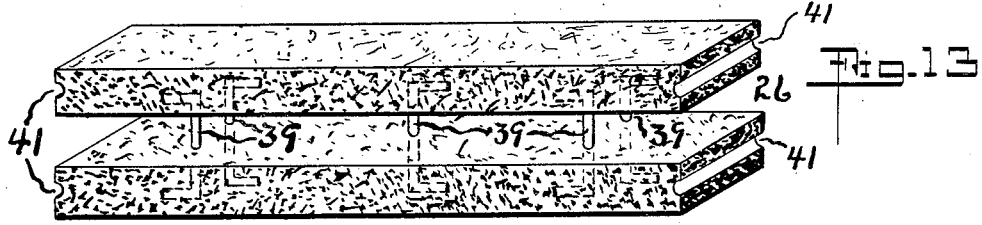
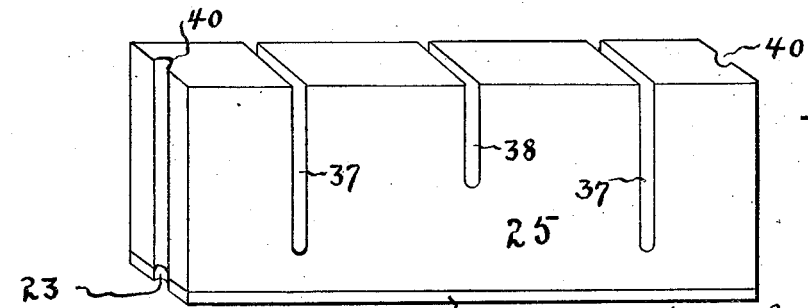

UNITED STATES PATENT OFFICE.

JOHN E. MOORE AND GEORGE F. SIMMONS, OF WALTHILL, NEBRASKA, ASSIGNORS OF THREE-FIFTHS TO WALDO E. WHITCOMB, OF WINNEBAGO, NEBRASKA.

CEMENT-BLOCK MACHINE.

937,627.      Specification of Letters Patent.      Patented Oct. 19, 1909.

Application filed January 23, 1909. Serial No. 473,858.

*To all whom it may concern:*

Be it known that we, JOHN E. MOORE and GEORGE F. SIMMONS, citizens of the United States, residing at Walthill, in the county of Thurston and State of Nebraska, have invented certain new and useful Improvements in Cement-Block Machines, of which the following is a specification.

This invention relates to improvements in cement block machines of the class employing a vertically movable core, also of the class whereby wall blocks may be formed composed of two secondary blocks bound or rigidly held adjacent and parallel by use of transverse tie-rods or anchors, the corner blocks also employing the tie-rods, whereby a complete air space may be formed in the wall intermediate the secondary blocks.

The object of the invention is to provide a machine for manufacturing the class of building blocks mentioned, which by reason of its novel features will be convenient and reliable in operation, durable in wear, and comprising few parts so that it may be economically constructed.

The invention has reference to the employment of a vertically movable core having tie-holding slots of different lengths for sustaining the ties while the block is being formed; to the construction of molding-plates, upon the inner surfaces of which are formed certain ridges to operate as core guides and as recess-formers; to adjustability of parts; to means for causing a non-vibratory, sliding movement of the vertically movable cores, and to a novel construction and mounting of a movable carrier-plate upon which may be secured either of the cores employed in the formation of the building blocks.

With these and other objects in view, the invention presents a novel combination and arrangement of parts, as described herein, pointed out by the appended claims and as illustrated in the accompanying drawing, wherein,—

Figure 5:
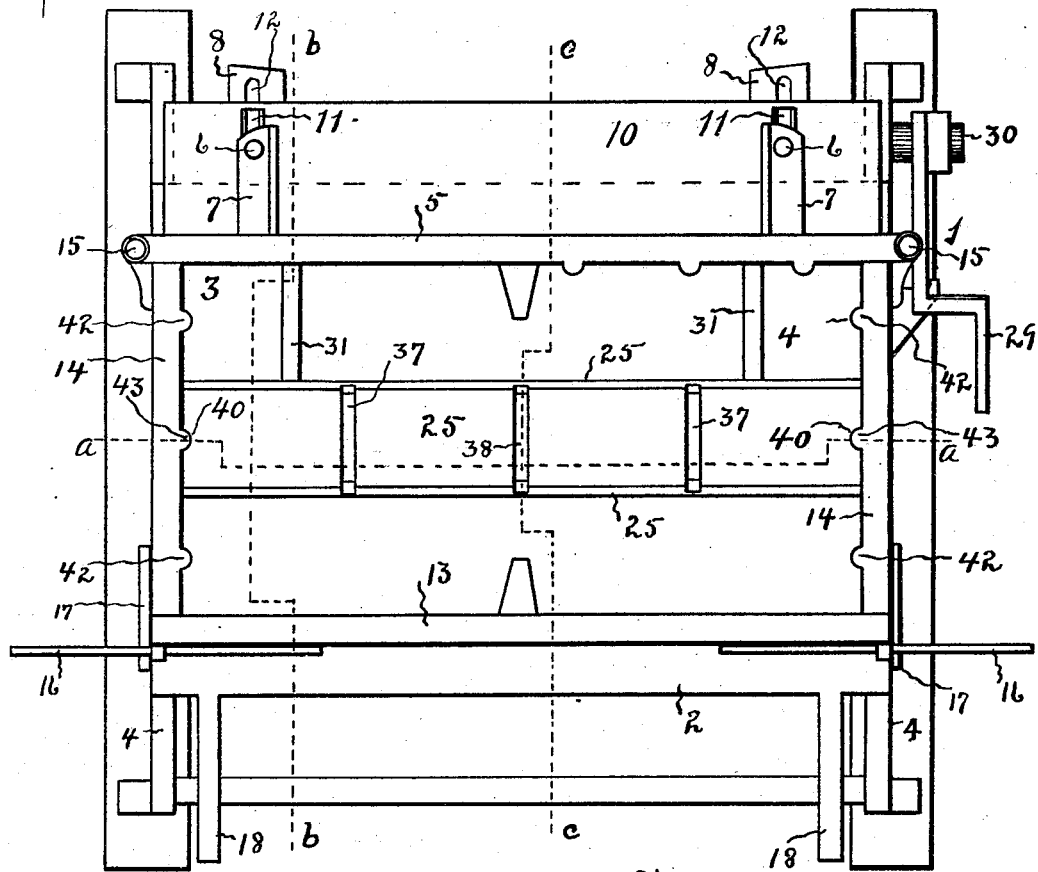
Figure 6:
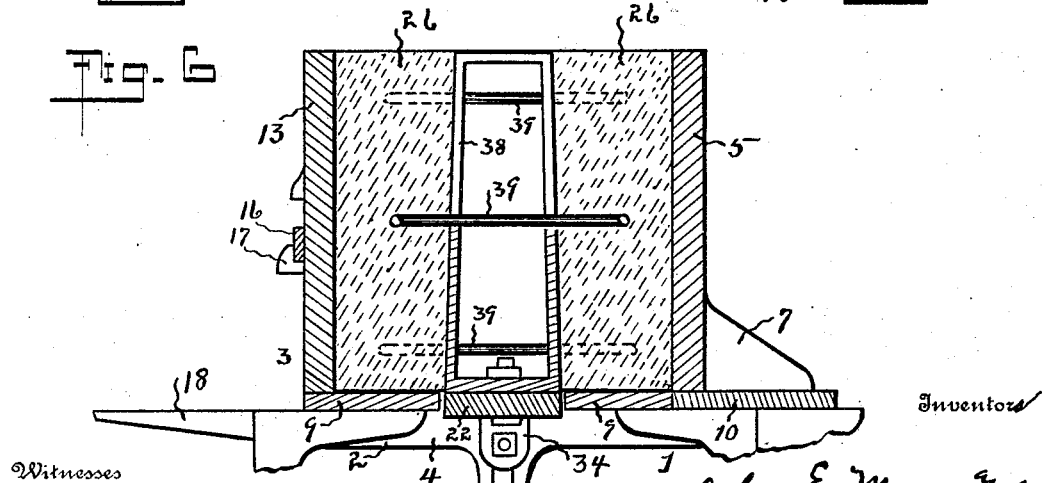

Figure 1 is a vertical front view of a cement block machine embodying our invention. Fig. 2 is a broken away side view showing parts when sectioned on line *a a* of Fig. 5, looking to the rear, the pallet being added. Fig. 3 is an end view of the machine. Fig. 4 is an end view, being a transverse section on irregular line *b b* of Fig. 5, a pallet being added to the figure. Fig. 5 is a plan view of the machine, the pallet being removed. Fig. 6 is a broken away end view, sectioned on line *c c* of Fig. 5, the pallet being added, and the molding-box filled. Fig. 7 is a plan view of the machine, with an L-shaped core and corner block seated therein. Fig. 8 is a perspective view of a portion of building wall, constructed of the blocks formed by the herein described machine. Fig. 9 is a vertical, front view of the machine, the front molding-plate being removed; the carrier-plate in this view is shown in a lowered position with the L-shaped core mounted thereon, and partly broken away. Fig. 10 is a transverse, sectional view, on line *d d* of Fig. 7. Figs. 11, 12, 13 and 14 are perspective views of the blocks and cores.

Referring now to the drawing for a more particular description, numeral 1 indicates a frame, preferably of metal, comprising a platform 2 upon which the molding box 3 is disposed, the platform having a convenient altitude and sustained by end supports 4. The molding box comprises a back mold-plate 5 secured vertically and rigidly, but removably, upon platform 2 by use of screw-bolts 6 which connect brackets 7 of the back plate with brackets 8 of the platform. The other plates of the molding box will be presently described.

Pallets used for forming rectangular blocks or those used when the corner blocks are formed, may have any desired thickness, as will be seen, the present construction providing for certain features of adjustment which will be explained. At 9 is indicated a pallet and at 10 is shown an adjusting-plate having transverse slots 11 which may be traversed by bolts 6. The adjusting-plate has a thickness equal to that of the pallet. The bottom of mold-plate 5 is flush with the bottom of bracket 7. Adjusting-plate 10 has a seating between the back mold-plate and platform 2 and between brackets 7 and 8; and thereby the construction is convenient since it is desirable to employ pallets having different degrees of thickness, and when a change is made in this respect an adjusting-plate of a corresponding thickness may be used. Brackets 8 of the platform are provided with slots 12, whereby an adjustment may be made to enlarge the molding box, when it is desired to form blocks of greater widths.

The front molding-plate is indicated at 13, and at 14 are indicated end molding-plates adapted to swing outward on hinges 15 supported upon the ends of the stationary back molding-plate. The front plate may be secured upon the end plates by means of latches 16 engaging with catches 17 of the end plates; the plan of the molding box, therefore, is rectangular when the molding plates are closed, and the end plates and back plate are substantially vertical. In operation, when removing the block, the ends of the latches may be manually raised, and the front plate may be swung down and may rest upon arms 18.

The herein described machine is adapted to form wall-blocks and corner blocks, and therefore two cores are employed, the principal mechanism, however, being the same, and this mechanism will now be described. At 19 are indicated guide-supports or standards disposed beneath the ends of the molding box, and constituting a part of the end-supports 2 of the frame, each having upon its inner side a longitudinal, vertical ridge or guide-member 20, and, disposed at their lower terminals are the stationary supports or lugs 21.

Normally supported upon lugs 21 intermediate standards 19 is the horizontal carrier-plate 22 having its ends in engagement with grooves 20, by means of slots formed in their ends and indicated at 23, and upon this carrier plate, by means of bolts 24, may be secured the rectangularly formed core 25, used for forming wall blocks 26; also upon said carrier-plate may be secured the L-shaped core 27, used in the formation of corner-blocks 28. As thus described, when one of said cores are secured upon carrier 22 it may have vertical movements to pass upward within the molding box or lowered therefrom, and since the ends of the carrier plate are in engagement with the longitudinal ridges or guides 20, the movement will not be attended with undue shocks or vibration.

As a means for moving the carrier-plate, operating-rod 29 is employed, and is rigidly mounted upon horizontal shaft 30, this shaft being mounted upon the lower and rear part of end-supports 2 and extending longitudinally of the machine. Near the ends of and rigidly upon shaft 30 at the inner side of end-supports 2 are mounted levers 31; these levers are disposed parallel with reference to each other and are inclined forwardly at all times. Upon the terminals of levers 31 are pivotally mounted at 32 the links 33, the upper end of said links being pivotally mounted upon staples 34 of the carrier-plate, and as is obvious, the parts as described may be operated to move the carrier plate vertically, as above mentioned.

For the purpose of forming cement wall blocks 26 the core shown at 25 is used, and will now be described. It is preferably formed as a casing, rectangular in cross section, preferably having a greater length than width, the core having a thickness sufficient to provide an adequate space between the walls of the block. It has openings 35 formed in its bottom. Carrier-plate 22 has openings 36, and these openings are convenient for access when securing the bottom of the core to the carrier. The core has a plurality of parallel tie-holding slots 37 and 38; they are formed transversely and are parallel with the ends of the core, opening upon the upper side or edge thereof. Slots 37 are formed near the ends of the core and extend to a point intermediate the middle and bottom, slot 38 terminating at the middle of the core.

In operation, after the core has been elevated, the molding box is filled with the plastic material used in forming the block, being tamped in the process of filling, and during this process tie-rods or anchors 39 are dropped in the slots and become embedded in the adjacent walls of the block, whereby the parts of the building block are held rigidly connected. According to this construction it will be seen that, while two of the ties or anchors may be disposed transversely within and near the bottom of the molding box so that the two parts of the block may be secured at points near their bottoms, the ties are prevented from being disposed too close to the bottom of the block, since they cannot pass lower than the bottom of the slots. During the process of filling, additional ties may be deposited at higher altitudes in slots 37.

It is of advantage when manually lifting or handling the building block to have a convenient handle provided, and therefore slot 38 is formed to terminate at the middle of the core; and when the block has been formed, the location of the tie, placed in slot 38, will be at the center of the block, at which point the block will balance. This new feature for reliably disposing the tie at the middle of the wall block will be appreciated by those conversant with the art of cement wall-building. Also this central support greatly strengthens the block. Core 25 is provided with end-grooves 40, disposed parallel with grooves 20 of supports 19, for uses hereinafter explained.

In order that the blocks may be secured in the wall of a building, they are provided with end-grooves or recesses 41; adjacently-disposed combs or ridges 42 are formed upon the inner side of each end molding-plate 14; these ridges are parallel, and are so disposed that when the block is formed, groove 41 is parallel with the outer sides of the block.

In order that the core may be withdrawn from the molding box without undue vibration, the guide-member or ridge 43 is formed upon each end molding-plate intermediate and parallel with ridges 42 for engagement with grooves 40 of the core. Ridges 43 are in alinement with ridges 20 of the frame, whereby carrier-plate 22 and the core may have vertical movements practically free from vibration.

Having described the construction and operation of the machine in connection with the use of the rectangularly formed core, the use of the L-shaped core for the formation of corner blocks will be readily understood. The L-shaped core is provided at one of its terminals with groove 44 for engagement with ridge 43 of the end molding-plate, its opposite terminal being provided with groove 45 for engagement with vertical ridge 46 formed upon the inner side and near one end of back molding-plate 5, both of these grooves, of course being parallel, and parallel with the ridges of the back plate and with the ridges of the end mold-plate. Upon said back mold-plate are formed ridges 47 and 48, said ridges being disposed upon respective sides of and parallel with ridge 46.

Ridge 48 is for the purpose of forming a recess 49 at one terminal of member 50 of corner block 28, groove 51 at the opposite end of this member being formed by one of ridges 42 of end mold-plate 14; and when placing the corner block in the building wall, it will be understood that recess 49 will register with recess 41 of the rectangular block to form a circular recess or opening 52 within which mortar or cement may be deposited for securely holding the block.

At the time of forming the corner block, tie rods 39 are used, and are deposited substantially as already explained. Member 53 of the corner block is held rigidly supported upon member 50 by means of tie-bolts 39 deposited in slots 54, 55 and 56, similar to those already described. By means of ridge 47 recess 57 is formed on the outer side and near the inner end of member 53 of the corner block, recess 58 upon its opposite end being formed by one of the ridges 42 of the end mold-plate. It will be understood that recess 57 of member 53 of the corner block registers with one of recesses 41 to form a circular opening 59 for the deposit therein of cement or mortar, when the wall of a building is formed. After the operating lever has been raised it is supported upon catch 60, upon the frame, thereby sustaining the core within the molding box.

Pallet 61 used when corner blocks are formed is somewhat different in form from pallet 9, this however requires no particular description.

It will be understood that in building a wall, recesses 58 and 51 of a corner block may register with recesses 41 of the rectangular block to form vertical openings 62 for the deposit of an adhesive material therein; likewise, recesses 41 of one rectangular wall block register with like recesses of an adjacent rectangular wall block to form similar openings, the complete wall, when formed, thereby being composed of blocks firmly held together, and providing an adequate air space. It is obvious that the ridges or combs 42 of the end molding-plates may be formed angular in cross section, and may be increased or decreased in size or their number may be increased, if desired without departing from the scope of the invention; and the particular form or angularity of guides 20 and 43 is immaterial, the important feature being that they are in alinement at the time the core is moving to a position within, or passing out of the molding box.

Having fully described our invention what we claim as new and desire to secure by Letters Patent is,—

1. In a concrete block molding machine, the combination with a supporting frame, of guide ridges mounted upon the inner faces of the end members of said supporting frame, a carrier plate slidably disposed upon said guide ridges, stationary supports located at the lower ends of said guide ridges adapted to limit the downward movement of the carrier plate, a hollow rectangular core having openings in the bottom thereof that register with openings formed in the carrier plate, fastening devices for securing the core to the carrier plate, the portion of the fastening devices within the core being accessible through the openings of the core and carrier plate, transverse tie receiving slots formed in the side and top walls of said core and extending downwardly for varying distances, a mold box into which said core projects, and guide members carried by said mold box and adapted to engage the ends of said core and means for adjusting said mold box bodily transversely of the machine.

2. In a concrete block molding machine, the combination with a supporting frame, of a mold box mounted for bodily transverse adjustment thereon, a hollow core mounted to move vertically into said mold box, and a carrier plate upon which said core is removably mounted, there being transverse tie receiving slots formed in the top walls of the core and extending downwardly for varying distances.

In testimony whereof we have affixed our signatures in presence of two witnesses.

JOHN E. MOORE.
GEORGE F. SIMMONS.

Witnesses:
HIRAM A. STURGES,
ARTHUR STURGES.